United States Patent Office 3,076,561
Patented Feb. 5, 1963

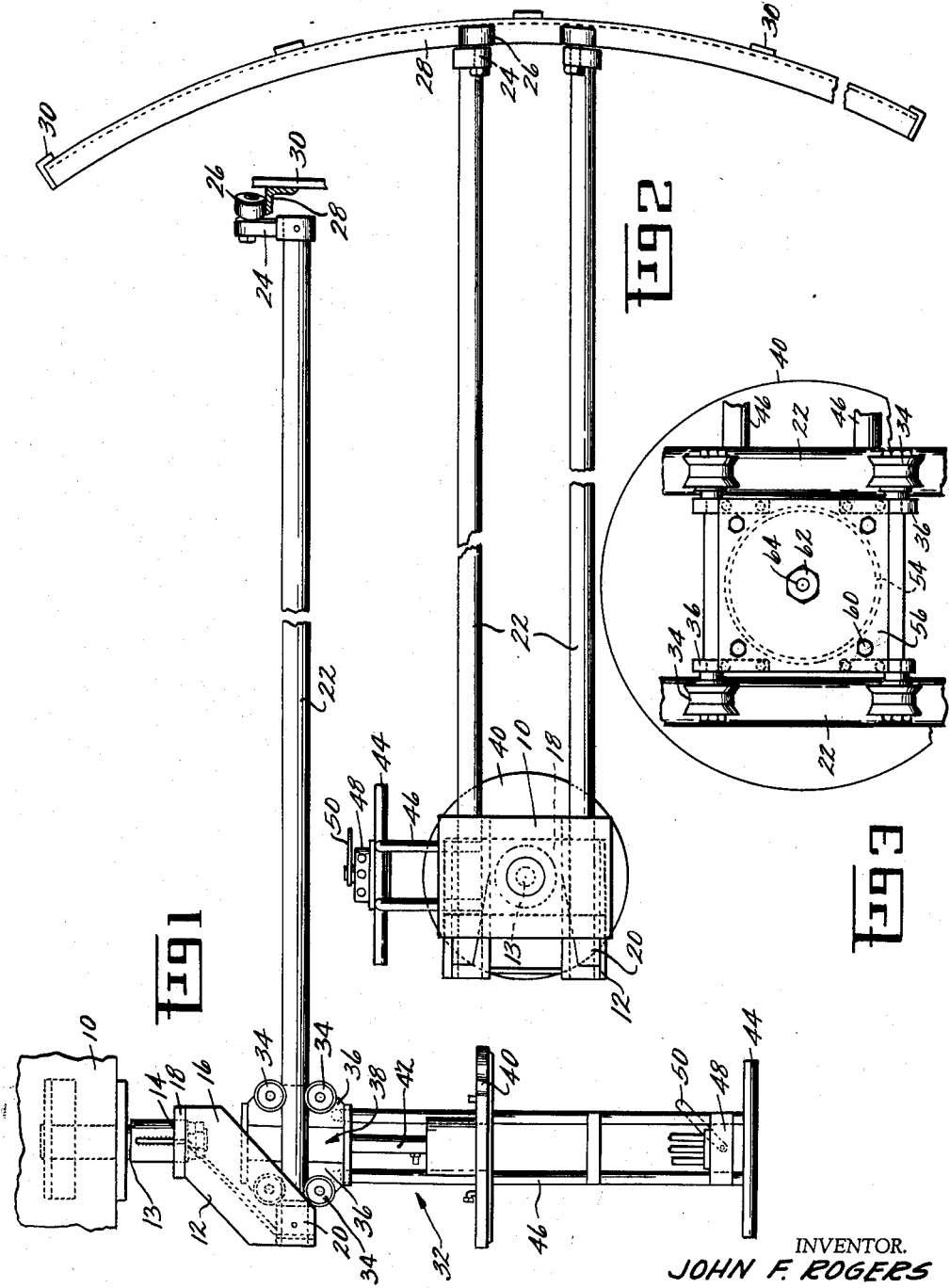

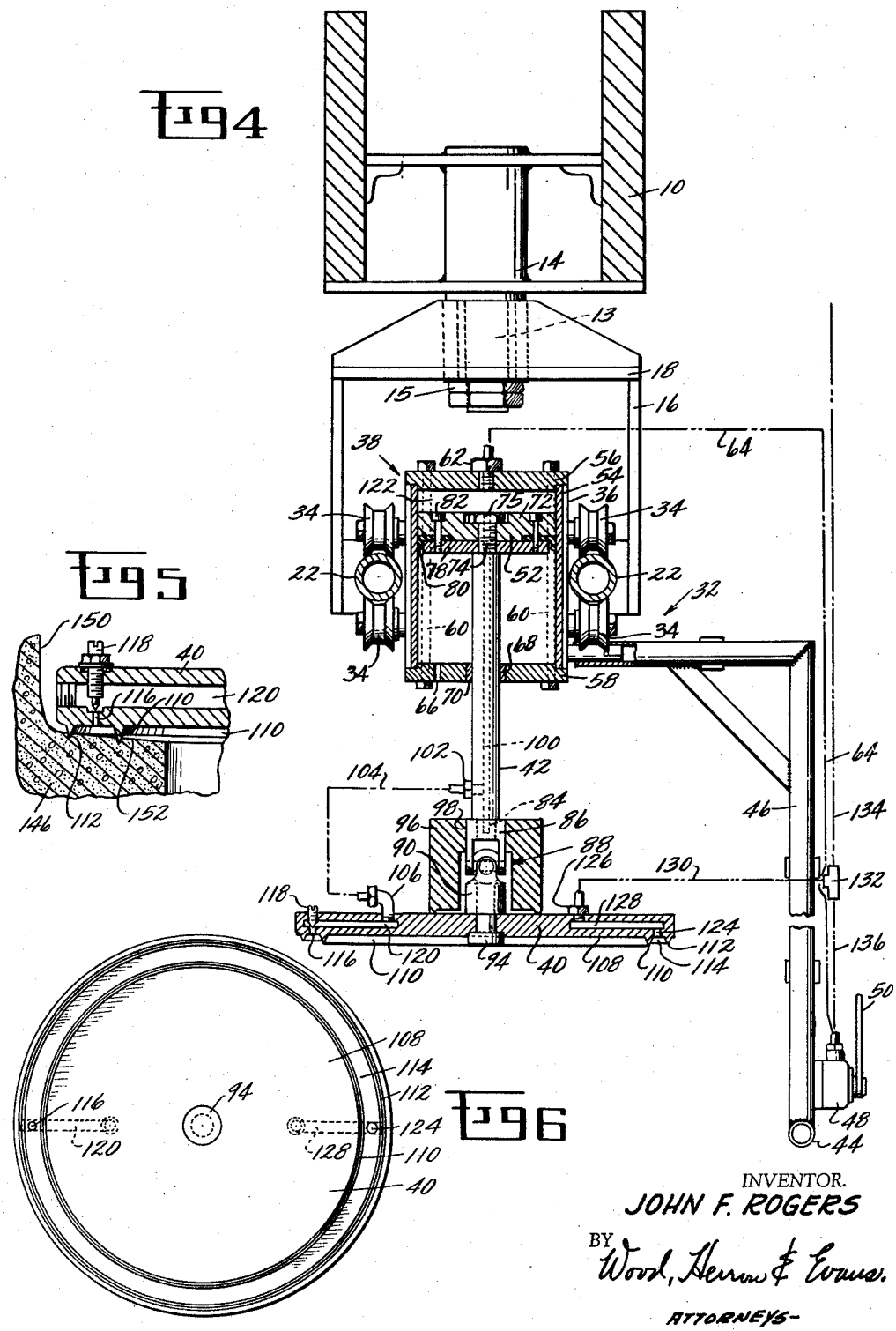

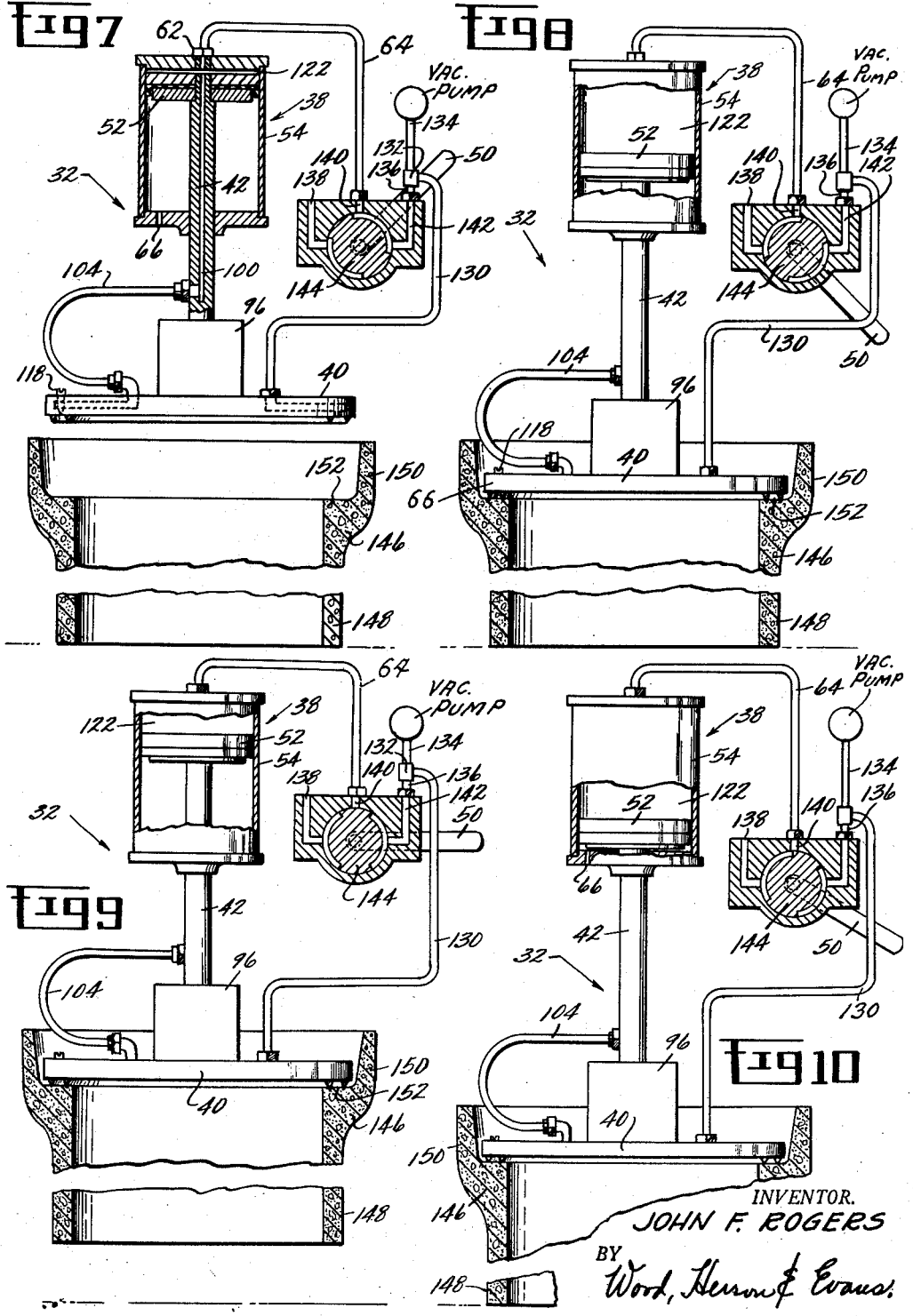

3,076,561
VACUUM TRANSFER DEVICE FOR MATERIAL IN A PLASTIC STATE
John F. Rogers, Wyoming, Ohio, assignor to M. S. Bowne, Clearfield, Ky., as trustee
Filed Mar. 6, 1958, Ser. No. 719,992
6 Claims. (Cl. 214—1)

This invention relates to a material handling apparatus and more particularly the invention is directed to a vacuum actuated mechanism for lifting and transferring articles or bodies which are of a plastic consistency.

The invention has particular relation to the handling of clay products such as sewer tile after they have been formed, but before they have been dried or fired to a hardened condition. The invention will be described with reference to its application of handling such sewer tiles but it should be understood that the invention is useful in handling other materials and structures of sufficient plasticity. For other applications of the invention some variation in the shape and size of the parts can be made without departing from the scope of the invention.

The conventional manufacture of sewer tile includes the steps of extruding the tile, from a press, and then manually carrying the tile to a dolly, pallet or other conveyor system for further processing. Where bell-end pipe is being made, it is conventional to extrude and form the bell-end first and then rest the pipe on its plain or spigot end. This process of production requires constant attendance of manual laborers at the extrusion press to lift and handle the ware. Recently some automatic equipment has been developed to perform the tasks heretofore performed by unskilled laborers, such as machines for receiving tiles from the extrusion machine and inverting the tiles to present the bell in an upwardly facing direction. Until the advent of the present invention, no satisfactory equipment has been provided to eliminate the laborers carrying of the tiles away from their point of discharge from the turnover machine.

A primary objective has been to provide lift apparatus for handling sewer pipe whereas, the tile is gripped by a vacuum applying device, lifted thereby and transferred, then lowered and disengaged from the applying device. However, because of the comparatively rough nature of the tile surface, and because of the surface configuration and surface irregularities of the tile, known devices for gripping the tile by vacuum could not be employed because an adequate vacuum seal could not be maintained to support the heavy weight. For example, an eight inch sewer pipe approximately three feet long will weigh approximately two hundred pounds.

To permit the use of vacuum gripping of material in a plastic state such as sewer tiles, the invention provides a support having an endless projection which is imbedded in the material, the material enveloping the imbedded projection to form a seal therewith. The material thus forms a vacuum chamber with the support and projection to which a vacuum is applied to form a grip between the support and material.

The invention further includes a piston and cylinder mechanism to which the vacuum is applied and released in a particular manner to perform the lifting and carrying functions with assurance that the tiles will not drop off the suction plate. Initially the vacuum is applied to the plate to form the tile gripping seal. A conduit connects the suction plate through a restricted orifice to the cylinder. Thus only when a sufficient vacuum is applied to the suction plate to form a gripping seal with the tile will vacuum be applied to the cylinder to lift the tile.

In releasing the vacuum after transfer, to set the tile in the desired position, the cylinder is connected to atmosphere in such a manner as to permit air gradually to diminish the degree of vacuum therein whereby the piston descends under its own weight and the weight of the ware supported by the suction plate. Restricted flow from the cylinder to the suction plate causes the air flow into the suction plate to lag the flow into the cylinder. Consequently the piston descends before the suction plate vacuum is released. This insures against damage to the ware by the inadvertent release of the ware before it has been set at rest at the point of discharge from the lifting and transferring mechanism.

Further objects of the invention will become more readily apparent from the following detailed description of the drawings in which a typical embodiment of the invention is illustrated.

FIG. 1 is an elevational view of the lifting and transfer apparatus;

FIG. 2 is a top plan view of the lifting and transfer apparatus;

FIG. 3 is a top plan view of the lifting cylinder;

FIG. 4 is a cross-sectional view of the lifting and transfer apparatus taken through the center of the lifting cylinder;

FIG. 5 is a fragmentary cross-sectional view of the vacuum applying plate;

FIG. 6 is a bottom plan view of the vacuum applying plate, and

FIGS. 7 to 10 are cross-sectional views showing the steps in the application of the invention to a tile.

FIGS. 1 and 2 illustrate the complete vacuum lift device and transfer apparatus. The mechanism is mounted on a support 10 from which depends a trolley pivot bracket 12. The trolley pivot bracket is pivoted about a pin 13 at its upper end 14 to the support 10, the bracket resting on a thrust bearing 15 (FIG. 4) connected to the support 10. The trolley pivot bracket 12 consists of two side members 16 secured to a plate 18 at the upper end thereof, each side member having a bore 20 at the lower end thereof to receive a pair of carriage roller rails 22.

The ends of rails 22 remote from the pivot bracket 12 are connected to brackets 24 to which rollers 26 are journaled. The rollers 26 engage an arcuate rail 28 mounted above the ground on supports 30. While the details of the unit thus far described are subject to considerable variation, it is apparent that in the embodiment illustrated the rails 18 permit a segmental area of substantial size to be served, the area being sufficient to assure that the tiles are out of the way of the extrusion and turn over machines so as not to impede efficient operation of the machines.

The carriage rails 22 support a lift mechanism, indicated at 32, on eight carriage rolls 34 which grip the rails 22 therebetween. The rolls 34 are journaled in roller brackets 36 which support a piston and cylinder arrangement 38. The piston and cylinder 38 support a suction plate 40 on a tubular piston rod 42.

An operator's handle 44 depends from the roller bracket 36 on a bracket 46. The operator's handle and bracket support a control valve 48 having a control handle 50 for the operation of the lift mechanism.

The operation of the assembly includes the lifting of the tiles through the operator's manipulation of the control handle 50, the transfer of the tiles through the operator's moving the carriage along rails 22 and swinging the trolley assembly on rails 28 until the carriage is in its proper position. The tile is then lowered to its proper position by manipulation of the control handle 50.

The construction of the lift assembly will be best understood by referring to FIGS. 3 to 6. The cylinder in which a piston 52 is slidably mounted consists of a cylinder barrell 54 closed at the upper end by a top plate 56 and at the lower end by a bottom plate 58 secured together by cylinder tie bolts 60 The plates 56 and 58 are supported by the roller brackets 36 (FIG. 3). The top plate 56 has a fitting 62 by which a conduit 64 is connected between the cylinder and the valve 48.

The bottom plate 58 is bored as at 66 to permit flow of air therethrough and is bored at 68 and fitted with a bushing 70 to slidably receive piston rod 42.

The piston 52 consists of a plate 72 centrally bored to receive a projection 74 integral with the end of piston rod 42. The projection 74 is externally threaded to receive a nut 75 which clamps the piston rod 42 to the plate 52. A piston cup follower 78 secures a sealing ring 80 consisting of a leather cup to the plate 72 by means of bolts 82.

The lower end of the piston rod 42 has a threaded tip 84 to which is fixed the upper end 86 of an universal joint 88. The lower end 90 of the universal joint has the suction plate 40 secured thereto by a bolt 94. A balance sleeve 96 is slidably mounted at 98 to the upper end 86 of the universal joint. The balance sleeve 96 engages the upper surface of the suction plate 40 and maintains the suction plate substantially perpendicular to the piston rod 42 but its slidable mounting permits angular adjustment of the plate to conform to the surface which it engages.

The piston rod 42 is bored at 100 at least down to a fitting 102 by which a flexible conduit 104 is connected to fitting 106 to the suction plate 40.

The suction plate 40 has a lower surface 108 from which project two concentric beads or blades 110 and 112 forming between them an annulus or vacuum cavity 114 which, with the ware and plate 40 form a suction chamber. The annulus 114 communicates with fitting 106 through a passage 120 and a small bore 116 metered by a needle 118 adjustably threaded into the plate 40.

Thus air can flow from the upper end 122 of the cylinder to the annulus 114 through the bored piston rod, a conduit 104, passage 120 and the restricted bore 116. The restricted bore 116 meters the air flow to provide a lag relationship between the vacuum condition in the annular chamber 114 and the cylinder, as will be more fully developed below.

Vacuum is also applied to the annulus through a bore 124 connected to a fitting 126 by a passage 128. A flexible conduit 130 is directly connected at 132 to a conduit 134 connected to the vacuum pump. The conduit 134 is also connected to the control valve 48 by a connection 136.

The construction of the control valve and the operation of the lifting device will be best understood by reference to the diagrammatic illustrations in FIGS. 7-10.

The control valve 48 includes a passage 138 to atmosphere, passage 140 to the cylinder and a passage 142 to the vacuum pump. The passages 140 and 142 are connected to the conduits 64 and 136 respectively. The flow of air through the passages 138 and 140 is controlled by a valve element 144 rotatably mounted in the control valve 48 and operated by control valve handle 50.

In operation, the needle 118 on suction plate 40 is turned down to restrict the flow of air through its associated bore 116. When the handle is raised to the "up" position shown in FIG. 7, valve control element 144 connects passage 140 to the vacuum pump through passage 142. Conduit 130 is sufficiently restricted to permit the vacuum pump to draw air through conduit 64. Thus a vacuum is applied through the conduit 64 directly to the upper cylinder chamber 122. The air pressure on the lower side of piston 52 elevates the piston 52 carrying with it the piston rod 42 and the attached suction plate 40, metering bore 116 causing the introduction of air into the cylinder through the tubular piston rod to lag the removal of air through the cylinder fitting 62. In this position the suction plate 40 is ready to be lowered to engage a tile 146.

The tile consists of an elongated cylindrical member 148 terminated at the upper end thereof in a bell 150 which presents a shoulder 152 to the lower surface of the suction plate 92. For use on those types of tile wherein the shoulder 152 has a slight inclination toward the center of the tile (FIG. 5) the suction plate bead 110 projects from the suction plate farther than bead 112, so that simultaneous engagement of the beads with the shoulder 152 is effected.

The next step of the operation is illustrated in FIG. 8 which shows the operating handle 50 moved to its "down" position. In this position the upper part 122 of the cylinder is exposed to atmosphere by the connection of the passage 140 to the passage to atmosphere 138. Under the piston and suction plate weight load the air in the lower part of the cylinder is discharged through the port 66 permitting the piston to descend. The suction plate 40 therefore engages the shoulder 152 of the sewer tile, and the sharp edged beads 110 and 112 of the suction plate sink into the relatively plastic clay and form a seal therewith at the shoulder.

The next step in the operation is illustrated in FIG. 9. In the "middle" position of handle 50 shown in FIG. 9 the flow of air through conduit 64 is blocked by the position of the control element 144 which blocks passage 140. Vacuum is applied through the conduit 130 to the annular chamber 114. As this chamber tends to become completely evacuated, thereby securely gripping the tile, air is evacuated from the upper part 122 of the cylinder. The air in the cylinder is drawn by the vacuum in the annular chamber 114 through the bore 100 in the tubular piston rod 42, conduit 104 and bore 116. The metering bore 116 causes a lag relationship of the condition of vacuum in cylinder to that in the annular chamber 114 so that after the seal formed by the imbedding of the beads 110 and 112 in the pipe is perfected, will the piston 52 rise carrying with it the suction plate 40 and the tile 146.

When in the elevated position illustrated in FIG. 9, the operator can pull the assembly along the roller rails 18 swinging the roller rails on the arcuate rails to the desired position.

When the assembly is in such a position the operation illustrated in FIG. 10 takes place. As shown in FIG. 10 the handle 50 has been lowered sufficiently to bring the valve element 144 into a position partially blocking the passage 140 and partially connecting the passage 140 to the atmosphere passage 138. The gradual flow of air from atmosphere into the upper part 22 of the cylinder diminishes the vacuum therein and permits the piston 52 to descend, gently resting the sewer tile 146 in its desired position.

The gradual descent of the piston permits the tile to be lowered without breaking the seal between the suction plate and the tile shoulder, that is, the air which is admitted to the cylinder does not pass immediately to the annular chamber 114. Rather the incoming air first fills the gradually expanding upper part 122 of the cylinder. When the piston 52 can descend no further, the low pressure area in the annular chamber 114 causes air to pass through the tubular piston rod 42, conduit 104 and bore 116, thereby admitting air to the annular chamber 114 and breaking the vacuum seal.

The operator elevates the handle 50 so that the control valve connections are as shown in FIG. 7 causing the piston 52 to rise and the plate 92 to assume the position shown in FIG. 7 ready to repeat the stages of operation described above. The resistance of conduit 130 to the flow of air permits the preferential evacuation of the upper cylinder chamber 122.

The removal of suction plate 40 from the tile leaves circular depressions in the shoulder 152. These depressions will eliminate the necessity of scoring of the tile bell shoulder which is sometimes provided for the formation of a leak-tight caulk at the joint between adjoining tiles.

While a specific embodiment of the invention has been described with particular reference to use in transferring sewer tile, it should be understood that the invention may take a wide variety of forms depending on the desired application without departing from the principles of the invention. For example, in the illustrated form, the invention utilizes a pair of concentric V-shaped beads to form a vacuum cavity. The bead configuration in this case, was determined by the shape of the sewer tile. With little change in design, the device could satisfactorily engage the spigot end of the tile rather than the bell end. Another type of piece might use a single endless bead of geometric form other than a circle, depending on the nature of the work piece. The bead could take an arbitrary shape so that the score line left by the bead would serve as a trademark applied to the ware.

The bead must be designed to enclose an area on the work piece of sufficient size to support the weight of the work piece, the minimum area being determined in accordance with the following formula:

$$A = \frac{W}{P_d}$$

where $A$ = the area within the bead
$W$ = the weight of the work piece
$P_d$ = the difference between atmospheric pressure and pressure within the evacuated chamber delineated by the bead.

The cross-sectional configuration of the bead as illustrated is V-shaped. The V provides a sharp edge for penetration into the plastic material. The sides of the V provide inclined surfaces against which the material is forced by atmospheric pressure, to bear, thus assuring that the seal between bead and material is maintained. The inclined surfaces also serve to limit the depth of penetration of the beads into the material, thereby preventing the material from completely filling the cavity and blocking the associated ports.

Variations in bead cross-section will be determined in part by the composition and plasticity of the material being handled. For example, the angle of the V may be greater for soft material than for hard material. The V might be in the form of a sharp blade for ease of penetration into hard material, a shoulder spaced from the blade edge being provided to limit penetration of the blade into the material.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described my invention, I claim:

1. Apparatus for handling material in a plastic state comprising, a support imbeddable in said plastic material to form a vacuum chamber therewith, a piston and cylinder transfer device, a rod connecting said piston to said support, first conduit means connecting the end of said cylinder remote from support to said vacuum chamber, a valve, second conduit means connecting the said remote end of said cylinder to said valve, a vacuum pump, a third conduit connecting said vacuum pump directly to said vacuum chamber, and control means in said valve for selectively connecting said second conduit to atmosphere for connecting said second conduit to said vacuum pump, and for blocking flow of air from the atmosphere through said second conduit means.

2. Vacuum lift apparatus comprising a support having a port at one face thereof, at least one endless bead projecting from said support around said port, said bead being generally V-shaped in cross-section and sufficiently sharp at its apex to be pressed into plastic material and form a vacuum seal therewith the V-shape of said bead acting to limit the depth of penetration thereof into said plastic material and thereby at least slightly space said support from the surface of said plastic, whereby the space within said bead between said support and said material constitutes a vacuum chamber, a cylinder having a vacuum operated piston connected to said support, means for operating said piston to raise said support, means for evacuating said vacuum chamber through said port and means for connecting said vacuum chamber to said cylinder to operate said piston upon evacuation of said chamber.

3. Apparatus for lifting a body of plastic consistency, which apparatus comprises a cylinder having a piston, a support connected to said piston, said support having a port therein and an endless rigid blade-like member surrounding said port and projecting from said support, said blade-like member being adapted to be imbedded in said body of plastic consistency to form therewith a vacuum chamber between the surface of said body and said support, means for evacuating said cylinder through said vacuum chamber whereby sealed engagement of said support with said body is established prior to evacuation of said cylinder sufficiently to effect movement of said piston therein, said evacuating means comprising a vacuum pump connected to said port, a passageway communicating between said vacuum chamber and the side of said piston remote from said chamber.

4. Apparatus for handling material in a plastic state comprising, a support imbeddable in said plastic material to form a vacuum chamber therewith, a piston and cylinder transfer device, a rod connecting said piston to said support, first conduit means connecting the vacuum end of said cylinder to said vacuum chamber, a valve, second conduit means connecting said cylinder to said valve, a vacuum pump, a third conduit connecting said vacuum pump directly to said vacuum chamber, control means in said valve for selectively connecting said second conduit to atmosphere for connecting said second conduit to said vacuum pump, and for blocking flow of air from the atmosphere through said conduit, and means for metering the flow of air through said first conduit means to govern the lag relationship of the vacuum condition between said cylinder and said chamber.

5. Apparatus for handling material in a plastic state comprising, a support imbeddable in said plastic material to form a vacuum chamber therewith, a piston and cylinder transfer device, a rod connecting said piston to said support, first conduit means including a bore through said rod connecting the end of said cylinder remote from said support to said vacuum chamber, a vacuum pump, and second conduit means connecting said vacuum pump directly to said vacuum chamber, whereby air may be withdrawn initially from said vacuum chamber to seal said support to said material, and subsequently from said cylinder through said rod to lift said piston, support and material.

6. Apparatus for handling material in a plastic state comprising a support imbeddable in plastic material to form a vacuum chamber therewith, lifting means, a vertical rod connected at the upper end thereof to said lifting means, a universal joint connecting lower end of said rod to said support, and a balance sleeve slidable on the upper portion of said universal joint and engaging said support to urge and maintain said support in a predetermined position while permitting said support to shift angularly upon engagement with the material to be lifted.

References Cited in the file of this patent

UNITED STATES PATENTS

| | | |
|---|---|---|
| 1,222,535 | Crum | Apr. 10, 1917 |
| 1,228,690 | Monnet | June 5, 1917 |
| 1,251,258 | Magill | Dec. 25, 1917 |
| 1,519,736 | Lewis | Dec. 16, 1922 |
| 1,800,385 | Hayes | Apr. 14, 1931 |
| 1,990,334 | Koppe | Feb. 5, 1935 |
| 2,247,787 | Schmidt | July 1, 1941 |
| 2,359,433 | McNamara | Oct. 3, 1944 |
| 2,679,940 | Goertz | June 1, 1954 |